United States Patent
Wang et al.

(10) Patent No.: US 10,314,128 B2
(45) Date of Patent: Jun. 4, 2019

(54) DIMMING CONTROL POWER SUPPLY FOR LED LAMPS

(71) Applicants: Self Electronics Co., Ltd., Ningbo, Zhejiang (CN); Wanjiong Lin, Ningbo, Zhejiang (CN); Self electronics USA Corporation, Norcross, GA (US)

(72) Inventors: Biao Wang, Zhejiang (CN); Lihong Tong, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 0 days.

(21) Appl. No.: 16/008,895

(22) Filed: Jun. 14, 2018

(65) Prior Publication Data

US 2019/0069363 A1    Feb. 28, 2019

(30) Foreign Application Priority Data

Aug. 25, 2017   (CN) .......................... 2017 1 0738724

(51) Int. Cl.
  *H05B 33/08*  (2006.01)
  *H04N 5/225*  (2006.01)
(52) U.S. Cl.
  CPC ....... *H05B 33/0845* (2013.01); *H04N 5/2256* (2013.01); *H05B 33/0818* (2013.01)
(58) Field of Classification Search
  CPC ............ H05B 33/0845; H05B 33/0818; H05B 33/0869; H05B 33/0815; H05B 33/0842; H05B 37/02; H04N 5/2256
  See application file for complete search history.

(56) References Cited

U.S. PATENT DOCUMENTS

| 2012/0153834 A1* | 6/2012 | Moss | ................. | H05B 33/0815 315/122 |
| 2015/0091464 A1* | 4/2015 | Yagi | ..................... | H05B 33/086 315/201 |
| 2016/0105939 A1* | 4/2016 | Lee | .................... | H05B 33/0845 315/201 |

* cited by examiner

*Primary Examiner* — Tung X Le
*Assistant Examiner* — Henry Luong
(74) *Attorney, Agent, or Firm* — Wang Law Firm, Inc.

(57) ABSTRACT

A dimming control power supply for LED lamps, comprises a first secondary power supply module, an output control module, a PWM signal receiving module, and a control signal converting module. The output control module is configured to adjust the output current according to the received constant DC voltage signal with a variable amplitude. The control signal converting module converts the PWM signal received by the PWM signal receiving module into a constant DC voltage signal with a variable amplitude. The output control module adjusts the output current according to the constant DC voltage signal with a variable amplitude to adjust the brightness of the LED lamps. The light source provided by the LED lamp powered by the dimming control power supply for the LED lamps doesn't form streaks in the photographs taken by the cell phone or the camera and thus enhances the user's light experience.

9 Claims, 2 Drawing Sheets

DIMMING CONTROL POWER SUPPLY FOR LED LAMPS

CROSS-REFERENCE TO A RELATED APPLICATION

This application claims priority to a Chinese Patent Application No. CN 201710738724.X, filed on Aug. 25, 2017.

FIELD OF THE TECHNOLOGY

The invention relates to the power supply of the LED lamps, with particular emphasis on a dimming control power supply for LED lamps.

BACKGROUND

In ordinary daily life, all kinds of lighting apparatus can be seen everywhere, such as fluorescent lamps, street lamps, table lamps, artistic lamps and so on. In the above-described lighting apparatus, the tungsten bulb is traditionally used as a light-emitting light source. In recent years, due to the ever-changing technology, light-emitting diode (LED) has been used as a light source. Moreover, in addition to lighting apparatus, for the general traffic signs, billboards, headlights etc., light-emitting diode (LED) has also been used as a light source. The light-emitting diode (LED) as a light source has the advantages of energy-saving and greater brightness. Therefore, it has been gradually common.

With the popularity of LED lamps, more and more occasions start using LED lamps, but as we all know, LED lamps are powered by a dedicated LED power supply. At the same time, with the improvement of living standard, people need the LED lamps with variable brightness output, therefore, the LED power supply with variable output power is needed. In the prior art, there are many LED power supplies that can change the output brightness of the LED lamps and have a variable output power. However, these LED power supplies in some cases do not give users a very good experience of using light, for example, in display lighting or in the museum, users prefer to use a mobile phone or a camera to photograph the displayed items. However, the existing LED power supply with variable output power makes the light source form streaks in the photographs taken by the cell phone or the camera. The streaks make the picture distorted, and affect the user's light experience.

SUMMARY OF THE INVENTION

Therefore, it is necessary to provide a dimming control power supply for LED lamps that avoids streaks when photographing to solve the above problem.

A dimming control power supply for LED lamps, comprising: s a first secondary power supply module, an output control module powered by the first secondary power supply module, a PWM signal receiving module for controlling output current of the output control module, and a control signal converting module electrically connected between PWM signal receiving module and the output control module, the output control module configured to adjust the output current according to received constant DC voltage signal with a variable amplitude; the control signal converting module configured to convert the PWM signal received by the PWM signal receiving module into a constant DC voltage signal with a variable amplitude; the output control module configured to adjust the output current according to the constant DC voltage signal with a variable amplitude to adjust brightness of the LED lamps.

Advantageously, the control signal converting module comprises a buck filter circuit electrically connected to the output terminal of the first secondary power supply module, and a voltage division circuit electrically connected with the buck filter circuit, and a filter circuit electrically connected between the voltage division circuit and the output control module.

Advantageously, the filter circuit comprises at least one RC circuit, each RC circuit comprises a resistor and a capacitor connected in series, free end of the first RC circuit is electrically connected with the voltage division circuit, free end of the capacitor is grounded.

Advantageously, the filter circuit comprises two RC circuits, each of the RC circuits comprises a resistor and a capacitor connected in series, the free end of the resistor R74 of the first RC circuit is electrically connected with the voltage division circuit, the free end of the capacitor C35 of the first RC circuit is grounded, and the free end of the resistor R73 of the second RC circuit is electrically connected between the resistor R74 and the capacitor C35, the free end of the capacitor C27 of the second RC circuit is grounded.

Advantageously, the PWM signal receiving module comprises an optocoupler diode as optical receiver, emitter of the optical receiver is grounded and collector of the optical receiver is electrically connected to the control signal converting module through a resistor R53.

Advantageously, the dimming control power supply further comprises a PWM signal generation module, wherein the PWM signal generation module comprises a PWM signal generator and a PWM signal transmitting unit electrically connected with the PWM signal generator, and the PWM signal transmitting unit comprises an optocoupler diode as optical transmitter, and the optical transmitter outputs a PWM signal, and the optical receiver receives the PWM signal from the optical transmitter.

Advantageously, the dimming control power supply further comprises a dimming signal input module electrically connected with the PWM signal generation module, and the dimming signal input module is configured to input a control signal to the PWM signal generation module to control a duty cycle of the PWM signal.

Advantageously, the dimming signal input module comprises a second secondary power supply circuit, a signal input circuit powered from the second secondary power supply, and a signal output sampling circuit for receiving the output signal of the signal input circuit, the PWM signal generator is electrically connected with the signal output sampling circuit to output a certain duty cycle of PWM signal according to the output of the signal output sampling circuit.

Advantageously, the dimming control power supply further comprises a primary power supply module, the primary power supply module is coupled to the first secondary power supply module to provide power for the first secondary power supply module.

Advantageously, the dimming control power supply further comprises a primary power supply module, the primary power supply module is coupled to the second secondary power supply module to provide power for the second secondary power supply module.

Compared with the prior art, since the dimming control power supply for the LED lamps has the control signal converting module as described above, firstly, the PWM signal for dimming is coupled to a reference voltage, and then the reference voltage coupled with the PWM signal is converted into a constant voltage with a certain amplitude. The output control module performs dimming according to the constant current voltage signal. Because there is no pulse of the PWM signal, the light source provided by the LED lamp powered by the dimming control power supply for the LED lamps doesn't form streaks in the photographs taken by the cell phone or the camera and thus enhances the user's light experience.

DETAILED DESCRIPTION OF THE DRAWINGS

The drawings described herein are intended to promote a further understanding of the present invention, as follows.

DESCRIPTION OF THE PREFERRED EMBODIMENTS

The present application is illustrated by way of the following detailed description based on of the accompanying drawings. It should be noted that illustration to the embodiment in this application is not intended to limit the invention.

Figure 1:
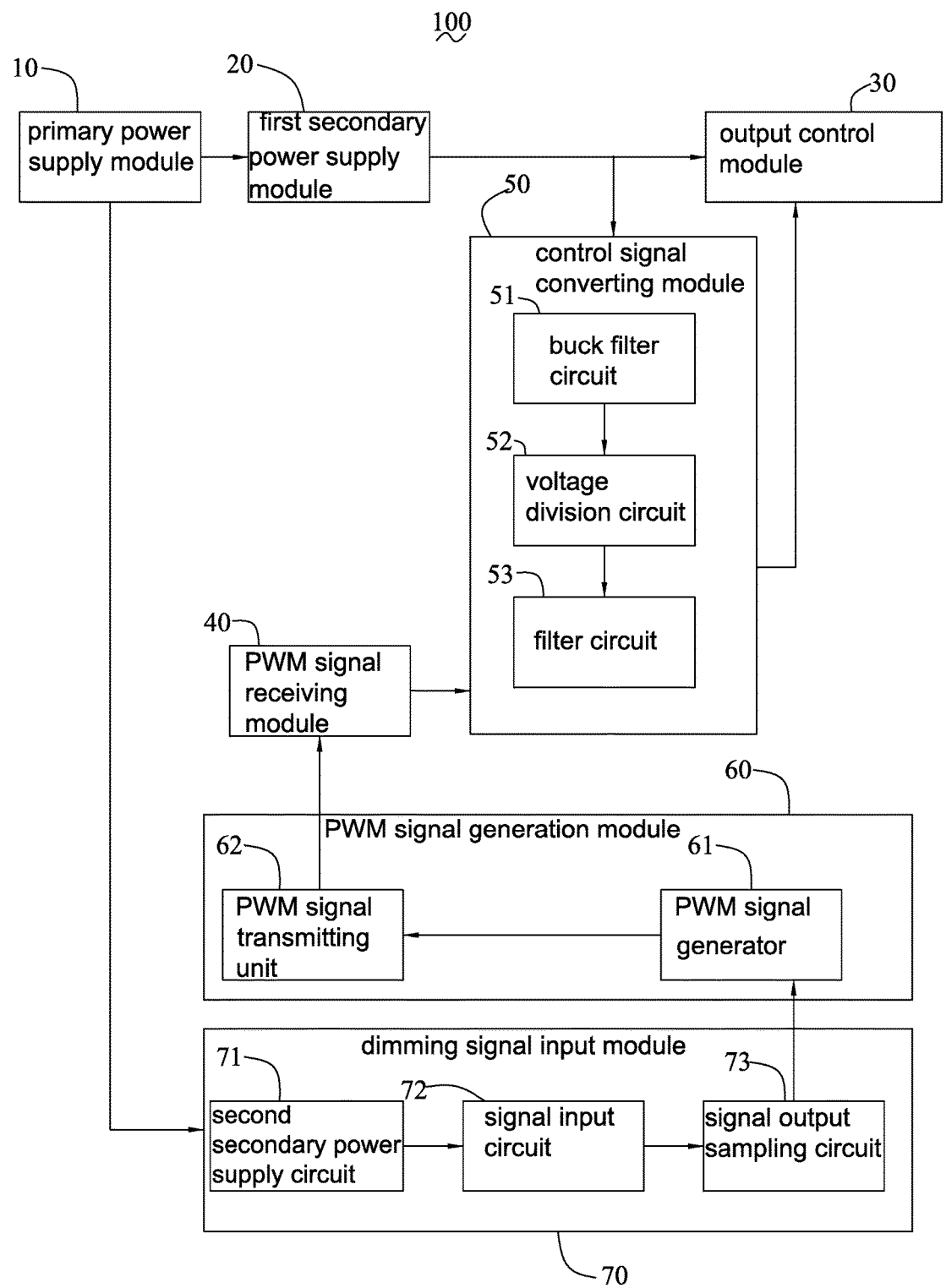
FIG. 1 is a schematic block diagram of a dimming control power supply for LED lamps provided by the present invention.
Figure 2:
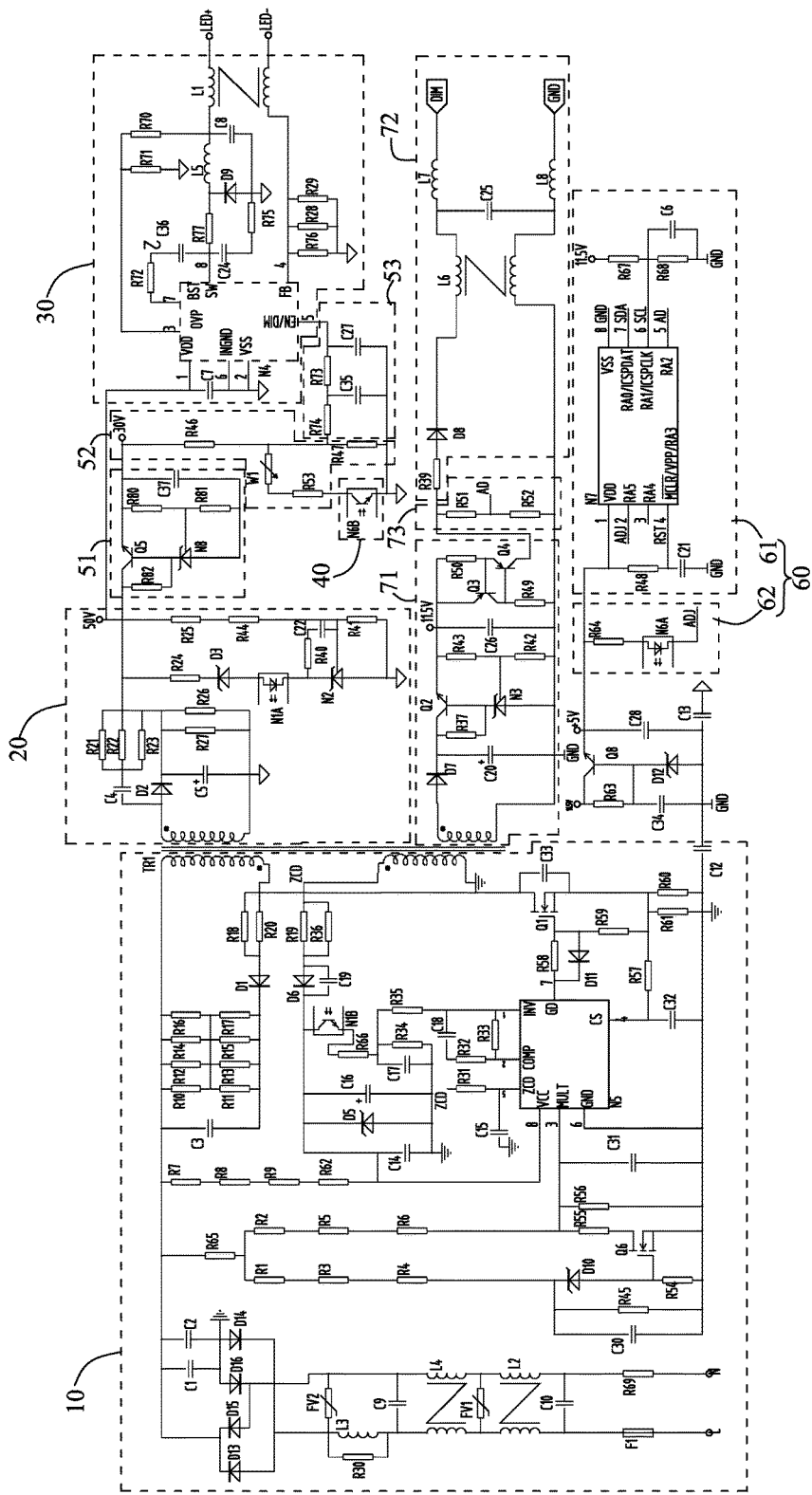
FIG. 2 is an application circuit diagram of the dimming control power supply for LED lamps of FIG. 1.

Please referring to FIG. 1, FIG. 2, which are a schematic block diagram and an application circuit diagram of the dimming control power supply 100 for LED lamps provided by the present invention. The dimming control power supply 100 for LED lamps comprises a primary power supply module 10, a first secondary power supply module 20 coupled to the primary power supply module 10, an output control module 30 powered by the first secondary power supply module 20, a PWM signal receiving module 40 for controlling the output current of the output control module 30, and a control signal converting module 50 electrically connected between the PWM signal receiving module 40 and the output control module 30, a PWM signal generation module 60 which provides a PWM signal to the PWM signal receiving module 40, and a dimming signal input module 70 electrically connected to the PWM signal generation module 60. It is conceivable that the dimming control power supply 100 for LED lamps may further comprise other functional modules such as an indicator circuit, an alarm circuit, and even a display output circuit, etc., which are well known to those skilled in the art and will not be described herein.

The primary power supply module 10 is connected with the electric supply, and it is used for converting alternating current into direct current for a load, that is, the current used by the LED lamp must be direct current. The primary power supply module 10 is an AC/DC conversion circuit that comprises a filter circuit, a rectifier circuit, a power factor correction circuit, a power conversion circuit, a feedback circuit, and the like. Each of the above circuit modules should be well-known to those skilled in the art, so only a brief description of the circuit modules will be described below. The filter circuit is used to filter out clutter and surges against surges to meet the requirements of electromagnetic compatibility. Generally, the filter circuit is composed of reactance components, such as parallel capacitors at both ends of the load resistor or in series with a load inductor, or a variety of complex filter circuit with capacitors and inductances. The rectifying circuit may be a bridge rectifying circuit that rectifies the unidirectional continuity of the diode to convert the alternating current into direct current. Bridge rectifier circuit usually uses four diodes connected two by two. When the positive half of the sine wave is input, two of the four diodes are conducted to output a positive half sine wave. When the negative half of the sine wave is input, the other two of the four diodes are conducted. The power factor correction circuit is configured to adjust the output of the power conversion circuit according to the input signal of the feedback circuit. Power factor refers to the relationship between effective power and total power consumption (apparent power), which is the ratio of effective power divided by total power consumption (apparent power). Basically, the power factor can measure the extent to which power is effectively used. The larger the power factor, the higher the power utilization rate. Therefore, in order to improve the power of the power correction factor, power supply is generally installed power factor correction circuit to improve power conversion efficiency. The power conversion circuit is configured to convert a high-voltage direct current into a low-voltage direct current suitable for a dimming control output circuit. The feedback circuit is electrically connected between the power conversion circuit and the power factor correction circuit to feed back the output signal of the power conversion circuit to the power factor correction circuit. The power factor correction circuit further adjusts the output signal of the power conversion circuit by comparing with part or all the output signals of the power conversion circuit, for example, it strengthens the output signal of the power conversion circuit or weakens the output signal of the power conversion circuit. After several corrections, the output signal of the power conversion circuit is output to the dimming control output circuit. It should be noted that the primary power supply module 11 comprises the circuit diagrams of the actual electronic components of the filter circuit, including the rectifier circuit, the power factor correction circuit, the power conversion circuit, and the feedback circuit. These circuits are known in the art and not be described in detail herein. In addition, it can be understood that each of the above functional circuits has an input and an output, and at the same time, each functional circuit is electrically connected to the output of the previous functional circuit and the input of the latter functional circuit.

The first secondary power supply module 20 is coupled to the primary power supply module 10 and converts the high-voltage direct current into a low-voltage direct current suitable for LED lighting through a transforming circuit included in the first secondary power supply module 20. In this embodiment, it can be seen from FIG. 2 that the low-voltage direct current output by the first secondary power supply module 20 is 50 volts. The 50 volts low voltage DC is provided to the output control module 30. The circuit components of the first secondary supply module 50 and the connection manner of the components should be technologies that a person skilled in the art can know according to actual needs and will not be listed here.

The output of the output control module 30 is electrically connected to the LED lamp and outputs a direct current to provide power for the LED lamp. Meanwhile the output control module 30 is further configured to adjust the output current of the LED lamp according to a received constant DC voltage signal with a variable amplitude to adjust the brightness of the LED lamp. In this embodiment, in order to simplify the circuit, the output control module 30 comprises a single-chip microcomputer to perform the control function. Of course, it can be understood that the circuit can also be constructed by the basic components such as a transistor, a diode and the like to complete the function of the single chip microcomputer, so that the output current of the first secondary power supply module 20 can be varied with the constant amplitude so as to change the output current value of the output control module 30 when the amplitude of the constant DC voltage signal changes so as to change the brightness of the LED lamp, and then achieve the purpose of dimming.

The PWM signal receiving module 40 is configured to receive PWM signals generated by other functional modules, such as the PWM signal generation module 60. The PWM signal is coupled to other signals to obtain the above constant DC voltage signal with variable amplitude. The working principle will be described in detail below. In this embodiment, the PWM signal receiving module 40 comprises an optocoupler diode as optical receiver N6B. As a prior art, the structure of the optocoupler diode and working principle is not described in detail here. The optical receiver receives the PWM signal generated by the PWM signal generation module 60. The collector of the optical receiver is electrically connected to the control signal converting module 50, the emitter is grounded. Of course, it is also conceivable that the PWM signal can also be transmitted by other operating modes, and the conductor can also transmit the PWM signal as required by the safety regulations without isolation. It is well known that a PWM signal is a pulse voltage signal with a certain duty cycle. The generation, transmission, and operation principle of the PWM signals are well known to those skilled in the art and will not be described in detail herein. What needs to be further explained is that the output voltage value can be adjusted by adjusting the duty cycle of the PWM signal.

The control signal converting module 50 receives the PWM signal from the PWM signal receiving module 40 and is used to convert the PWM signal into a constant current voltage signal with a variable amplitude. At the same time, the converted constant-current voltage signal with a variable amplitude is also transmitted to the output control module 30 to adjust the brightness of the LED lamp. The control signal converting module 50 comprises a buck filter circuit 51 electrically connected to the output terminal of the first secondary supply module 20, a voltage division circuit 52 electrically connected with the buck filter circuit 51, and a filter circuit 53 electrically connected between the voltage division circuit 52 and the output control module 30. Of course, it can be understood that the functions of the control signal converting module 50 can also be implemented in other ways, such as using a microcontroller, a microprocessor operating in conjunction with a software, or the like. In the present embodiment, the above-mentioned conversion function is accomplished using basic electronic components for cost reasons. As shown in FIG. 2, the buck filter circuit 51 comprises a transistor Q5 whose collector is electrically connected to the first power supply circuit 20, a resistor R82 connected to a collector and a base of the transistor Q5, an controlled precision voltage regulator N8 whose anode is connected to the base of the transistor Q5, two resistors R80, R81 connected in series between the emitter of the transistor Q5 and the cathode of the controlled precision voltage regulator N8, a capacitor C37 connected in parallel with the two resistors R80, R81. The reference pole of the controllable precision voltage regulator N8 is connected between two resistors R80 and R81 connected in series. Through the above circuit design and with reference to FIG. 2, those skilled in the art should understand the working principle of the buck filter circuit 51, and it will not be repeated here. The buck filter circuit 51 outputs a voltage without noise through the function of the buck filter circuit 51. In this embodiment, the voltage outputted by the buck filter circuit 51 is 30 volts, which becomes a reference Voltage.

The voltage division circuit 52 comprises two resistors R46 and R47 connected in series. One end of the resistor R46 is connected to an output terminal of the buck filter circuit 51, and one end of the resistor R47 is grounded. The voltage dividing circuit 52 further comprises a resistor R53, one end of the resistor R53 is connected between the resistors R46 and R47, and the other end of the resistor R53 is connected to the output terminal of the PWM signal receiving module 40. In the present embodiment, the other end of the resistor R53 is connected to the collector of the optical receiver. Preferably, the resistor R53 is also connected in series with an adjustable resistor W1 to regulate the voltage applied between the resistors R46, R47 when needed. It can be understood that, the magnitude of the current flowing between the resistors R46 and R47 can be known by designing the resistances of the resistors R46 and R47. When the PWM signal is generated by the PWM signal receiving module 40, a voltage of the PWM signal is also loaded between the resistors R46 and R47, so that the PWM signal can be coupled into the control signal converting module 50. The filter circuit 53 comprises at least one RC circuit, each RC circuit comprises a resistor and a capacitor connected in series, free end of the first RC circuit is electrically connected with the voltage division circuit, free end of the capacitor is grounded. In this embodiment, the filter circuit 53 comprises two RC circuits, each of the RC circuits comprises a resistor and a capacitor connected in series, the free end of the resistor R74 of the first RC circuit is electrically connected with the voltage division circuit, the free end of the capacitor C35 of the first RC circuit is grounded, and the free end of the resistor R73 of the second RC circuit is electrically connected between the resistor R74 and the capacitor C35, the free end of the capacitor C27 of the second RC circuit is grounded. The filter circuit 53 can convert the DC voltage of the PWM pulse voltage coupled from the voltage division circuit 52 into a constant DC voltage signal. When the duty cycle of the PWM signal changes, the constant DC voltage signal becomes a constant DC voltage signal with a varying amplitude. Therefore, the constant DC voltage signal with the amplitude change is called the constant DC voltage signal with varying amplitude. The constant DC voltage signal with the varying amplitude is transmitted to the output control module 30 so that the output control module 30 adjusts the brightness of the LED lamp. The EN terminal of the microcontroller of the output control module 30 is connected between the resistor R73 and the capacitor C27.

The PWM signal generation module 60 is configured to provide a PWM signal for dimming the dimming control power supply 100. The PWM signal generation module 60 comprises a PWM signal generator 61 and a PWM signal transmitter unit 62 electrically connected to the PWM signal generator 61. The PWM signal generator 61 may include a single-chip microcomputer. The working principle of the PWM signal generated by the microcontroller is well known to those skilled in the art and will not be described in detail herein. When the PWM signal generator 61 receives an input signal with a constant value of the dimming signal input module 70, the PWM signal generator 61 outputs a PWM signal with a certain duty ratio. The PWM signal transmitting unit 62 comprises the optocoupler diode as an optical transmitter N6A. The optical transmitter N6A and the optical receiver N6B of the PWM signal receiving module 40 form an optocoupler. The optical transmitter N6A transmits the PWM signal to the PWM signal receiving module 40, and at the same time utilizes the function of the optocoupler to play a role of isolation to meet the safety requirements. It should be noted that, the PWM signal generation module 60 further comprises a power supply circuit for providing power to the single chip microcomputer, which should be known to those skilled in the art.

The dimming signal input module 70 comprises a second secondary power supply circuit 71 coupled to the primary power supply module 10, a signal input circuit 72 powered from the second secondary power supply circuit 71, and a signal output sampling circuit 73 for receiving the output signal of the signal input circuit 72. The second secondary power supply circuit 71 is mainly used to provide power for the signal input circuit 72. As a reduction voltage circuit, it should be known to a person skilled in the art, and details are not described herein again. According to the voltage output by the second secondary power supply circuit 71, the magnitude of the current in the entire loop can be changed by increasing the resistance and by changing the resistance of the resistor. The signal input circuit 72 is the circuit for changing the resistance, as shown in FIG. 2, is not described here in detail. Therefore, by simple calculation, the value of the constant current voltage loaded on the output control module 30 corresponding to the changed magnitude of the resistance value can be calculated, that is, the value of 1 to 10 volts in the prior art. The signal output sampling circuit 73 comprises two resistors R51, R52 connected in series. The two resistors R51 and R52 are electrically connected to the loop of the second secondary power supply circuit 71 and the signal input circuit 72, and the resistors R51 and R52 are the sampling voltages to be output. That is, the input terminal of the PWM signal generator 61 is electrically connected between the two resistors R51 and R52 of the signal output sampling circuit 73. The PWM signal generator 61 outputs a PWM signal with a certain duty ratio according to the voltage between the resistors R51 and R52, that is, the output value of the signal output sampling circuit 73.

Compared with the prior art, since the dimming control power supply for the LED lamps has the control signal converting module 50 as described above, firstly, the PWM signal for dimming is coupled to a reference voltage, and then the reference voltage coupled with the PWM signal is converted into a constant voltage with a certain amplitude. The output control module 30 performs dimming according to the constant current voltage signal. Because there is no pulse of the PWM signal, the light source provided by the LED lamp powered by the dimming control power supply 100 for the LED lamps doesn't form streaks in the photographs taken by the cell phone or the camera and thus enhances the user's light experience.

The above disclosure has been described by way of example and in terms of exemplary embodiment, and it is to be understood that the disclosure is not limited thereto. Rather, any modifications, equivalent alternatives or improvement etc. within the spirit of the invention are encompassed within the scope of the invention as set forth in the appended claims.

The invention claimed is:

1. A dimming control power supply for LED lamps, comprising:
a first secondary power supply module,
an output control module powered by the first secondary power supply module,
a PWM signal receiving module for controlling output current of the output control module, and
a control signal converting module electrically connected between the PWM signal receiving module and the output control module, the output control module configured to adjust the output current according to a received constant DC voltage signal with a variable amplitude, the control signal converting module comprises a buck filter circuit electrically connected to an output terminal of the first secondary power supply module;
a voltage division circuit electrically connected with the buck filter circuit, and a filter circuit electrically connected between the voltage division circuit and the output control module;
the control signal converting module configured to convert the PWM signal received by the PWM signal receiving module into the constant DC voltage signal with the variable amplitude;
the output control module configured to adjust the output current according to the constant DC voltage signal with a variable amplitude to adjust brightness of the LED lamps.

2. The dimming control power supply as claimed in claim 1, wherein the filter circuit comprises at least one RC circuit, each RC circuit comprises a resistor and a capacitor connected in series, a free end of the at least one first RC circuit is electrically connected with the voltage division circuit, and a free end of the capacitor is grounded.

3. The dimming control power supply as claimed in claim 2, wherein the filter circuit comprises two RC circuits, each of the two RC circuits comprises the resistor and the capacitor connected in series, a free end of a resistor (R74) of the first RC circuit is electrically connected with the voltage division circuit, a free end of a capacitor (C35) of the first RC circuit is grounded, and a free end of a resistor (R73) of the second RC circuit is electrically connected between the resistor (R74) and the capacitor (C35), a free end of a capacitor (C27) of the second RC circuit is grounded.

4. The dimming control power supply as claimed in claim 1, wherein the PWM signal receiving module comprises an optocoupler diode as optical receiver, an emitter of the optical receiver is grounded and a collector of the optical receiver is electrically connected to the control signal converting module through a resistor (R53).

5. The dimming control power supply as claimed in claim 4, wherein the dimming control power supply further comprises a PWM signal generation module, wherein the PWM signal generation module comprises a PWM signal generator and a PWM signal transmitting unit electrically connected with the PWM signal generator, and the PWM signal transmitting unit comprises an optocoupler diode as optical transmitter, and the optical transmitter outputs a PWM signal, and the optical receiver receives the PWM signal from the optical transmitter.

6. The dimming control power supply as claimed in claim 4, wherein the dimming control power supply further comprises a dimming signal input module electrically connected with the PWM signal generation module, and the dimming signal input module is configured to input a control signal to the PWM signal generation module to control a duty cycle of the PWM signal.

7. The dimming control power supply as claimed in claim 6, wherein the dimming signal input module comprises a second secondary power supply circuit, a signal input circuit powered from the second secondary power supply, and a signal output sampling circuit for receiving an output signal of the signal input circuit, a PWM signal generator is electrically connected with the signal output sampling circuit to output a certain duty cycle of PWM signal according to an output of the signal output sampling circuit.

8. The dimming control power supply as claimed in claim 7, wherein the dimming control power supply further comprises a primary power supply module, the primary power supply module is coupled to the second secondary power supply module to provide power for the second secondary power supply module.

9. The dimming control power supply as claimed in claim 1, wherein the dimming control power supply further comprises a primary power supply module, the primary power supply module is coupled to the first secondary power supply module to provide power for the first secondary power supply module.

* * * * *